July 2, 1963  R. J. SCHILLINGER  3,095,731
TONOMETER
Filed Oct. 13, 1960
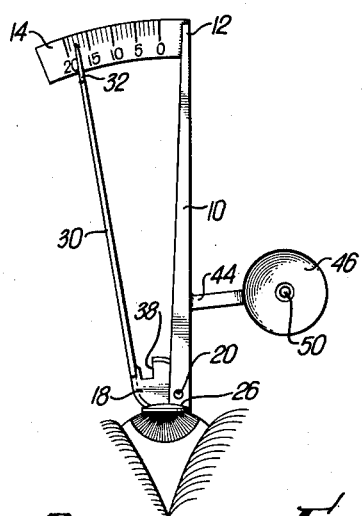
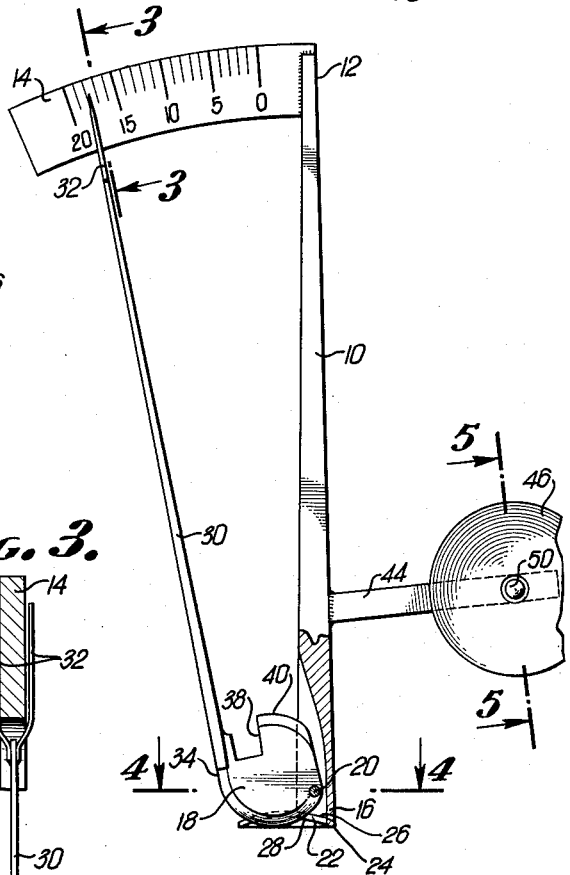
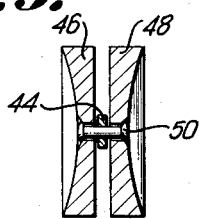
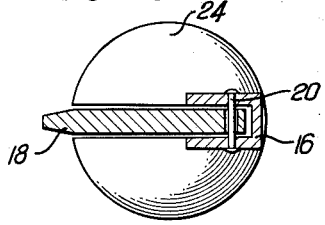
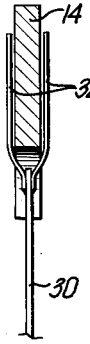
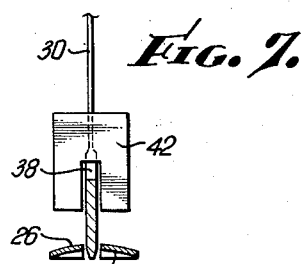
INVENTOR.
ROBERT J. SCHILLINGER
BY John Joseph Hull
ATTORNEY.

United States Patent Office 3,095,731
Patented July 2, 1963

3,095,731
TONOMETER
Robert J. Schillinger, 1717 Pablo Place,
Palos Verdes Estates, Calif.
Filed Oct. 13, 1960, Ser. No. 62,477
7 Claims. (Cl. 73—80)

This invention relates to improvements in tonometers, which are instruments for measuring the intraocular pressure within the eye, and in particular to a new and unique type of tonometer utilizing pivot means for measurement of intraocular pressure.

Hitherto, conventional tonometers have used plunger and cylinder or sleeve type mechanisms which operate basically in a linear or up and down motion. Such conventional tonometers require many moving parts, usually about four in number, which have a great tendency to stick, thereby producing a large source of error in measurement of intraocular pressure. As will be seen, my invention removes this source of error by providing only two moving parts both of a pivot type which are easily movable and have no tendency to stick.

Further, conventional tonometers are not designed to be sterilized for use as surgical instruments during an operation where it is desired to measure the intraocular pressure of the eye. The design of my tonometer permits it to be sterilized like any surgical instrument by conventional means such as an autoclave.

It is, therefore, an object of my invention to provide a tonometer which utilizes pivotal motion for the measurement of intraocular pressure of the eye.

Another object of my invention is to provide a tonometer with only two moving parts of the pivot type in lieu of four or more moving parts which perform the same function in conventional tonometers of the plunger and cylinder or sleeve type.

A further object of my invention is to provide a tonometer which can be sterilized for use as a surgical instrument for measurement of intraocular pressure during surgery of the eye.

A still further object of my invention is to provide a tonometer which produces a more rapid and accurate measurement of intraocular pressure than conventional tonometers.

These and other objects will be more readily understood in conjunction with the accompanying drawing in which—

FIGURE 1 is a vertical side view of my tonometer depicting its use on an eye.

FIGURE 2 is a detailed side view of my tonometer.

FIGURE 3 is a view taken along line 3—3 of FIGURE 2.

FIGURE 4 is a view taken along line 4—4 of FIGURE 2.

FIGURE 5 is a view taken along line 5—5 of FIGURE 2.

FIGURE 6 is a detail section of the indentation wheel of the tonometer.

FIGURE 7 is a view taken along line 7—7 of FIGURE 6.

In the construction of my device, the supporting frame 10 has at its top 12 a calibrated scale 14. At the other end 16 of the frame 10 is an indentation wheel 18 which is pivotally mounted to the frame 10 by pin 20. The indentation wheel 18 is free to swing away from the frame 10 and pass through a slot 22 cut into a circular footplate 24 which is attached to the bottom 26 of the frame 10. The footplate 24 has a concave face 28 which conforms to the curvature of the eyeball.

A pointer 30 ending in double prongs 32 on each side of the scale 14 is attached to the rim 34 of the indentation wheel at 36. A groove 38 is cut into the top portion 40 of the indentation wheel to hold weights 42 of varying amounts so that various calibrations of the scale 14 may be made. The weights 42 may be color coded to correspond with various colors on the scale 14 to indicate the particular calibration of the scale to be used with a particular weight or weights. Thus, the working range of my tonometer can be greatly extended using such weights.

An arm 44 projects out from the frame 10 to serve as a holding means for the tonometer in conjunction with freely rotatable wheels 46 and 48 which are pivotally mounted by pin 50 on the arm 44.

In the operation of my device, the tonometer is held in a vertical position by compressing the wheels 46 and 48 with the thumb and forefinger and the footplate 24 is positioned on the center of the eye of a person who is lying down and looking straight up. Finger pressure on the wheels 46 and 48 is then decreased, leaving only enough pressure to maintain the tonometer in a vertical position. At this point, the force of gravity will cause the indentation wheel 18 to pivotally rotate away from the frame 10 through the slot 22, after it impinges upon the person's eye, causing the rim 34 to swing into the cornea of the eye to a depth inversely proportional to the intraocular pressure of the eye. As the indentation wheel moves, the pointer 30 does likewise, thereby indicating a reading on the scale. Suitable calibration of the scale can be made with the various weights 42 which increase the effective weight of the indentation wheel 18.

All of the parts of my tonometer, including the scale, are preferably made of various types of stainless steel suitable for sterilization by conventional methods such as an autoclave. Thus, my tonometer can be readily used as a surgical instrument during an eye operation when readings of intraocular pressure of the eye are desired.

While I have described my invention in detail with reference to the accompanying drawing illustrating the preferred form of my invention, it is understood that numerous changes in the details of construction and operation of parts may be made without departing from the spirit and scope of the invention as described and hereinafter claimed.

For example, the indentation wheel need not be completely round, or round at all. It may be of any shape permitting suitable rotation and impingement upon the eye which will produce a measurement of the pressure within the eye.

Further, the principle of the indentation wheel may be used in conjunction with several methods of indicating a measurement of the intraocular pressure, such as a disc instead of a pointer, or a mirror reflecting the image of the pointer, or by electronic or other optical means. Thus, my invention is not limited to any particular method of indicating a reading of the extent of the movement of the indentation wheel or its equivalent.

I claim:

1. A sterilizable tonometer, comprising a frame having a scale at its upper end, a footplate attached to the bottom of the lower end of the frame and having a slot, an indentation wheel pivotally mounted at the lower end of the frame and rotatable through the slot, a pointer attached to the indentation wheel and swingable over said scale, and means on the frame providing a hand support.

2. A sterilizable tonometer, comprising a frame having a scale at its upper end, a footplate attached to the bottom of the lower end of the frame and having a slot, an indentation wheel pivotally mounted at the lower end of the frame and rotatable through the slot, a pointer attached to the indentation wheel and swingable over said scale, and an arm mounted on the frame and extending outwardly therefrom to provide a hand support.

3. A sterilizable tonometer, comprising a frame having a scale at its upper end, a footplate attached to the bottom of the lower end of the frame and having a slot, an indentation wheel pivotally mounted at the lower end of the frame and rotatable through the slot, a pointer attached to the indentation wheel and swingable over said scale, and an arm mounted on the frame and extending outwardly therefrom and having parallel wheels pivotally mounted on each side at its outer end to provide a hand support.

4. A sterilizable tonometer, comprising a frame having a scale at its upper end, a footplate attached to the bottom of the lower end of the frame and having a slot, an indentation member pivotally mounted at the lower end of the frame and rotatable through the slot of the footplate and having means for supporting one or more removable weights, indicating means connected to the indentation wheel and so arranged as to indicate a reading on the scale in accordance with the rotation of the indentation member, and means on the frame providing a hand support.

5. A sterilizable tonometer, comprising a frame having a scale at its upper end, a footplate attached to the bottom of the lower end of the frame and having a slot, an indentation member pivotally mounted at the lower end of the frame and rotatable through the slot of the footplate and having a groove cut into its upper rim to receive one or more removable weights, indicating means connected to the indentation member and so arranged as to indicate a reading on the scale in accordance with the rotation of the indentation member, and means on the frame providing a hand support.

6. A sterilizable tonometer, comprising a frame having a scale at its upper end, a footplate attached to the bottom of the lower end of the frame and having a slot, an indentation member pivotally mounted at the lower end of the frame and rotatable through the slot of the footplate and having a groove cut into its upper rim to receive one or more removable weights, a pointer attached to the indentation member and swingable over said scale in accordance with the rotation of the indentation member, and an arm mounted on the frame and extending outwardly therefrom to provide a hand support.

7. A sterilizable tonometer, comprising a frame having a scale at its upper end, a footplate rigidly attached to the bottom of the lower end of the frame and having a slot, an indentation wheel pivotally mounted at the lower end of the frame and rotatable through the slot of the footplate and having a groove cut into its upper rim to receive one or more removable weights, a pointer attached to the indentation wheel and swingable over said scale in accordance with the rotation of the indentation wheel, and an arm mounted on the frame and extending outwardly therefrom and having parallel wheels pivotally mounted on each side at its outer end to provide a hand support.

References Cited in the file of this patent

UNITED STATES PATENTS 2,520,223    Sovatkin _____ Aug. 29, 1953